Patented May 25, 1937

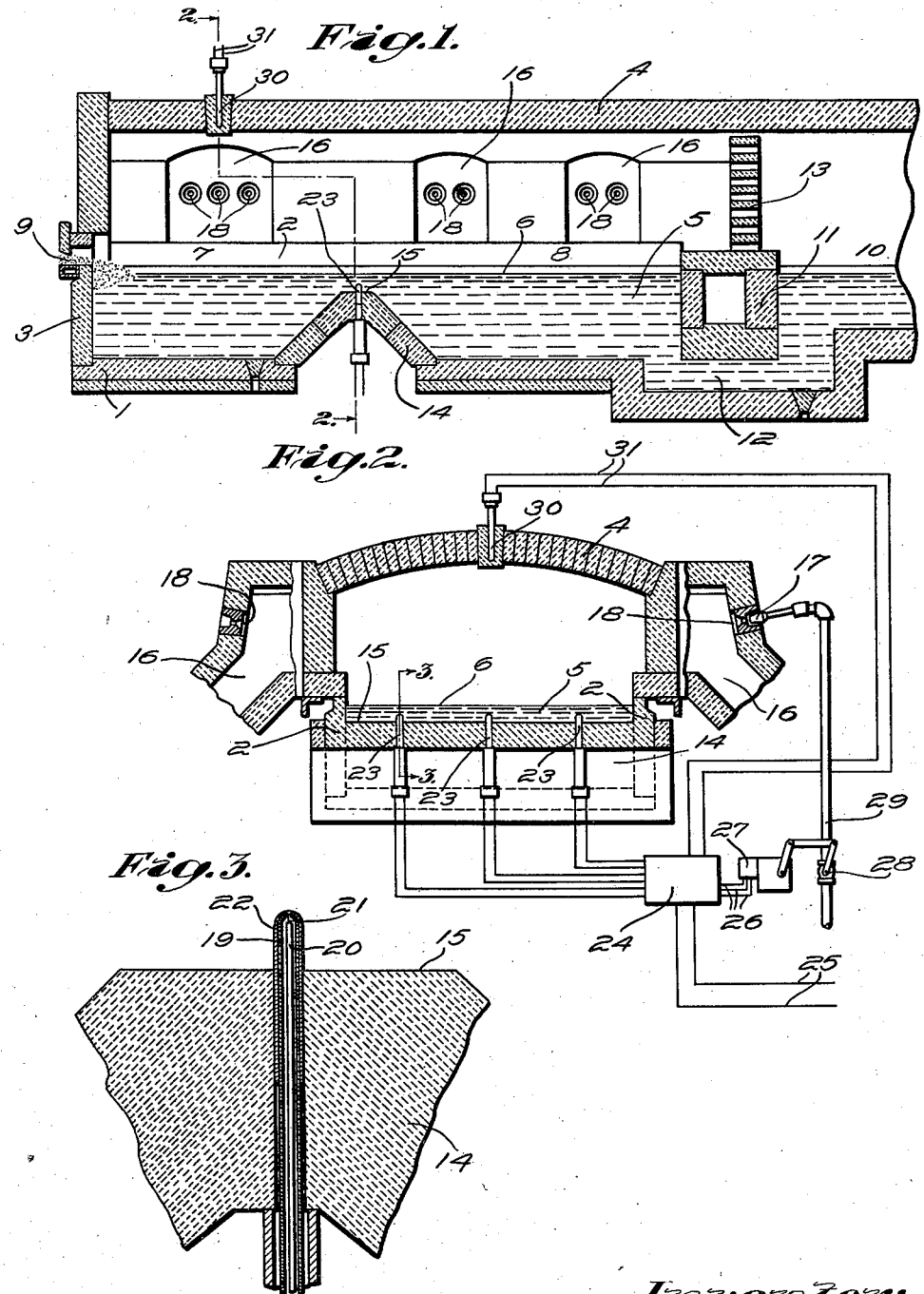

2,081,595

UNITED STATES PATENT OFFICE 2,081,595

APPARATUS FOR INDICATING AND CONTROLLING TEMPERATURES IN GLASS MELTING TANKS

Harold W. McIntosh, Windsor, Conn., assignor to Hartford-Empire Company, Hartford, Conn., a corporation of Delaware Application September 24, 1935, Serial No. 41,886

8 Claims. (Cl. 49—54)

This invention relates to an apparatus for indicating and controlling the temperatures in tanks in which glass is continuously melted, and more particularly for obtaining an indication of a characteristic average temperature of the glass itself at some point in a tank where that temperature will be representative of the average temperature of the glass in the melting and refining portions of the tank.

In the past, it has been common practice to project a temperature responsive device, as a radiation pyrometer or thermocouple, through the crown or roof of a tank to obtain the temperature available to such instrument. It has also been common practice to use an optical pyrometer directed either at the sidewalls or crown of the tank or at the glass therein. It has also been attempted to place a thermocouple in direct contact with the glass at a point which, for reasons hereinafter to be set forth, is necessarily close (perhaps ¼") to some wall confining a bath of glass. All these prior art practices have been to a major extent unsatisfactory for the reason that the temperature recorded thereby and thus the temperatures available for use for controlling the rate of supply of heat to the tank have been subject to so many extraneous influences that the control effected in response thereto has fallen far short of that desired.

For example, any temperature responsive device which indicates and/or records the temperature in the flame space above the glass has been unsatisfactory for indicating glass temperature as the temperature at this point is normally somewhat higher than that of the glass itself. Also the temperature in the flame space in regenerative furnaces is variable and includes sharp dips whenever the furnace is reversed. It is not desired that the rate of supply of heat be varied each time the furnace is reversed, but this would result with a use of a system of this kind if the flame space temperature were used as an index.

Such temperature responsive devices are also subject to being cooled to a material extent upon the introduction of batch or glass making materials into the tank, which in many instances in the prior art is effected at intervals of perhaps twenty minutes. This also causes a sharp dip in the temperature recorded by the instrument with the result in the event of automatic control that an unnecessary increase was made in the rate of supply of heat to the tank, which resulted in the uneven operation of the tank as a whole. Instruments of this type are further subject to variations in meteorological conditions, including the rate, velocity and direction of the wind, the outside temperature and the barometric pressure. These conditions, while affecting the instruments, do not similarly affect the average glass temperature.

Devices, such as optical pyrometers, directed at the glass are subjected to many conditions resulting in the temperature recorded or indicated thereby being materially different from any characteristic average temperature of the glass itself. This may have been due to a certain extent at least to the fact that glass is by nature transparent, so that the temperature recorded by the instrument is not that of the glass, but is a composite including the temperature of the glass and the temperature of tank walls, the flame, etc., all of which vary with the conditions above referred to and also vary materially with different rates of pull on the tank, that is, amounts of glass being withdrawn from the tank per unit of time.

In the case of thermocouples which project directly into the glass from a confining wall for the bath of glass, it has been necessary heretofore to mount such couples very close to the tank walls. This resulted in their being subject only to the temperature of the glass closely adjacent to such walls. Due to the fact that the heat loss through the walls in glass tanks is relatively large, the glass closely adjacent to the walls is substantially stagnant, so that its temperature changes very little, if any, with material changes in any characteristic average temperature of portions of the glass which are being circulated in the tank or being drawn through it under the influence of the pull thereon. The limitation upon the use of such couples in the past has been that the wires leading to and joined to make the couples have been of such material that they could not be projected any material distance into the glass and be retained at such position. If they were protected by a casing of refractory material, such for example as sillimanite, the corrosive action of the glass upon the material of the protecting tube was so great at the high temperatures to which it was desired to expose the couples that these tubes had a very short life. On the other hand, when it was attempted to put these thermocouples inside some metallic protection or thimble of a type which would be neutral to glass and relatively little affected thereby, the metal of the protecting thimble was so soft when subjected to the high temperatures to which it was necessarily exposed that it had insufficient mechanical strength.

Fundamentally, the problem of making good and uniform glass is one of giving the glass a predetermined treatment; and it is to a major extent the temperature of the glass during its stay in the tank in the melting and refining portions thereof which is directly controlling as to the characteristics of the finished glass. Therefore, in order to obtain good glass under varying rates of pull and varying external conditions with any kind of control of temperature either manual or automatic, it is a prime requisite that the temperature control be effected in response to a characteristic average temperature in the glass itself independently of what the temperature may be above the glass or elsewhere in the tank. Thus it is essential that the temperature of the glass itself be ascertained.

An object of the present invention therefore is to provide means for obtaining an indication of temperature of the glass in a tank which will be characteristic of the average temperature of the glass, whether or not it is a true average of that temperature, but according to which indicated temperature the supply of heat to the tank may be controlled to obtain and maintain a desired average temperature in the glass or desired temperatures at selected points in the glass.

In connection with the above, it is an object of the invention to obtain an indication of the temperature of the glass at some one or more points which will be substantially unaffected by extraneous influences, such as the reversal of the direction of flame in a regenerative tank, the meteorological conditions, the intermittent supplying of glass making materials or batch to the tank and the rate of pull on the tank.

A further and more specific object of the present invention is to obtain an indication of a characteristic temperature and preferably an average temperature in the glass in a freely flowing stream of completely melted glass in a tank specifically between the point at which the glass is completely melted in the melting zone of the tank and the termination of the zone in which refining of the glass takes place. Such a flowing stream may be set up within a tank by convection currents induced by the establishment of a hot spot or zone at one point to produce upwardly moving currents in the bath at and adjacent to such hot zone and falling currents at some other zone or zones of the tank where cooling is taking place, as at the sidewalls. Another way of obtaining a flowing stream of glass is to provide a constriction intermediate the melting and refining zones of the tank, as by providing a bridge wall having a submerged throat, a lateral constriction forming a neck, or as specifically illustrated in the accompanying drawing by the provision of a weir extending upwardly from the bottom of the tank to a desired distance below the normal level of the bath of glass therein. In whatever way this constriction is made, there will necessarily be a freely flowing stream of glass through or across it, due to the pull of glass from the tank. Under certain conditions of circulation, there may be a stream flowing in the opposite direction as from the refining to the melting zone through such constriction, the flow in this direction however being balanced in all cases by a flow from the melting chamber to the refining chamber of as much glass as is flowing in the first named direction plus an amount equal to the rate of glass withdrawal from the tank due to the pull thereon. It has been found that if the average temperature of the glass in a freely flowing stream is obtained, such temperature will be characteristic of the temperature of the glass in the tank and will provide an indication according to which the heat supplied to the tank may be controlled either manually or automatically with desirable results. The temperature of such a flowing stream of glass is furthermore substantially independent of many if not all the extraneous influences above referred to. The attaining of a reliable indication of the temperature of such a stream is a further object of the present invention.

Another object of the present invention is to provide a temperature responsive device in such relation to a tank that it will be away from any point in the bath of glass where unmelted batch or glass making materials should normally be present, so that in the event that such materials are present at the index point, they will result in the lowering of the temperature indicated by the instrument, which will indicate the improper operation of the tank. Thus such improper condition may quickly be corrected either manually or automatically.

A further specific object of the invention is to provide a plurality of temperature responsive devices at spaced intervals across the path of a freely flowing stream of glass as aforesaid specifically by locating these devices in a constricted passage of the tank intermediate the melting and refining zones thereof.

A further object of the invention is to provide for the obtaining of an indication of temperature as aforesaid by the use of a thermocouple which is protected first by a tube of ceramic material, such for example as sillimanite, to afford the desired mechanical strength, so that the couple and the lead wires thereto may be projected a material distance into the path of a freely flowing stream of glass, while at the same time preventing the corrosive effects of the hot glass upon the protecting ceramic material by surrounding such material with a metallic thimble of difficultly fusible metallic material which is neutral to glass, so that the glass will be unaffected in color by contamination from the metal in contact therewith.

A further object of the present invention is to provide apparatus for effecting a control as above set forth, in which a safety means is provided including a device responsive to the temperature in the tank above the normal level of the glass therein, preferably in the crown of the tank, and so arranged that in the event the control system should so adjust the heat supplying means as to generate an excessive temperature at the point where the second temperature responsive device is located, the rate of heat supply will be limited to maintain it within safe limits, thus preventing the burning out of the crown and walls of the tank.

Other and more specific objects of the present invention will become apparent from a reading of the following description and appended claims, all when taken in connection with the accompanying drawing in which:

Figure 1 is a partial longitudinal vertical section of a glass melting tank to which my invention is applied;

Fig. 2 is a view taken substantially in vertical section on the line 2—2 of Fig. 1, the intake ports for the combustion supporting air being broken away to show the internal construction and the arrangement of the burners; and Fig. 3 is a fragmentary view on an enlarged scale and in vertical section substantially on the line 3—3 of Fig. 2.

I have chosen to illustrate my invention as applied to a glass making tank of substantially the same type as that forming the subject matter of the copending application of Vergil Mulholland, Serial No. 730,441, filed June 13, 1934 for Glass making apparatus and method, which application is owned in common with the present one. The present application, however, distinguishes from the aforesaid Mulholland application in that it is directed solely to the temperature responsive means and/or the automatic controlling system associated therewith, while the Mulholland application is directed to the tank per se and certain other associated means.

As shown in the accompanying drawing, the tank comprises a bottom 1, sidewalls 2, an end wall 3 at the batch feeding end and a crown 4. Within this construction is contained a bath of glass generally indicated at 5, which is normally maintained up to a fixed predetermined level 6. The tank may be considered as divided into a melting chamber or zone 7 and a refining chamber or zone 8. Provision is made as indicated generally at 9 for supplying glass making materials or batch to the melting chamber and provision is made at the further end of the refining chamber for the withdrawal of finished glass therefrom. In this case, the refining chamber 8 is separated from a tempering chamber 10 by a bridge wall 11 beneath which the glass flows through one or more submerged channels 12, substantially as in the usual practice. Above the bridge wall 11 there is illustrated diagrammatically a shadow wall 13. Intermediate the melting and refining chambers there is a weir here generally indicated at 14, the top 15 of which is disposed at a predetermined distance below the normal level 6 of the bath of glass in the tank, to provide a constricted passage across the weir connecting the melting and refining chambers. The weir 14 extends from side to side of the tank with the top 15 thereof at a uniform distance below the normal level 6 of the glass in the tank.

Means are provided for supplying heat to the tank for melting the glass making materials in the melting chamber 7 and for refining the completely melted glass in the refining chamber 8. Such means in the present instance comprise regenerative heating means including the air ports and conduits, shown in Fig. 2 at 16, into which burners 17 are directed through burner ports 18. As set forth in the Mulholland application aforesaid, separate heating means may if desired be provided for the melting chamber and a plurality of separately and individually controllable means may be provided in the refining chamber, but inasmuch as the particular type of heating means per se form no necessary part of the present invention, these means have been shown only diagrammatically and will not be further described.

I have found as set forth hereinabove that the means heretofore available for ascertaining the temperature of the glass itself in a tank are unsatisfactory for the reasons given and possibly for other reasons. Inasmuch as it is necessary in order to obtain uniform glass to be able to control the temperature of that glass and inasmuch as it is necessary in order to control the temperature of the glass to know the temperature of the glass itself, I have provided a new and improved method and apparatus for ascertaining, indicating and recording the glass temperature rather than the temperature of some other parts of the furnace or at some other position. For this purpose, I prefer to use a temperature responsive element or device, preferably a thermocouple, which will be so located as to respond to the temperature of the glass of a freely flowing stream of completely melted glass in the bath, as I have found that the temperature of stagnant glass adjacent to any glass containing walls is not characteristic of the average temperature of the glass in the bath and does not change therewith in any uniform relation. Specifically it is not sufficiently sensitive to material changes of the average temperature of glass of the bath to be of any real utility.

Inasmuch as glass is melted and refined according to present processes at temperatures of the order of magnitude of 2500 to 2800° F., the problem of introducing a thermocouple substantially into the path of a freely flowing stream of glass at this temperature is one involving considerable difficulty. It has been found, for example, that materials which may be used to protect the thermocouple and retain it in a desired position and which have sufficient mechanical strength for this purpose, such as ceramic materials, for example sillimanite, are of such nature as to be chemically attacked by the glass with a result that their life is extremely short. On the other hand, if a thermocouple be located within a thimble of practical dimensions of some difficultly fusible metallic material, such as platinum or an alloy of platinum, the metal while not being attacked by glass and not contaminating the glass, has little if any mechanical strength at the temperatures to which it must be subjected.

I have, therefore, used a combination of a ceramic thimble as indicated at 19, Fig. 3, within which is a ceramic member 20 for conducting the lead wires to a thermocouple 21, the upper end of the ceramic thimble 19 being open so as to expose the thermocouple to the heat from above. This construction furnishes the necessary mechanical strength. In order to provide the protection needed to prevent extremely rapid erosion and corrosion of the ceramic thimble 19, I prefer to surround it with a metallic thimble 22 of some difficultly fusible metallic material, such as platinum or an alloy of platinum, which will prevent contact between the glass and the ceramic material therein while at the same time serving to conduct heat therethrough, so that the thermocouple 21 will be at the temperature of the surrounding metallic thimble, which is substantially the temperature of the glass. By using such a construction, I am enabled to project the device a material distance into the glass, so as to obtain a characteristic temperature substantially within a freely flowing stream of glass, the location of the temperature responsive device as a whole being such as to cause the couple to lie within the path of such stream.

While I contemplate that one or more couples, as just described, might be used in tanks of many different designs, so long as they are located substantially as aforesaid, I prefer that these devices be located in or closely adjacent to a constriction in the tank, preferably between the melting and refining portions thereof, so as to lie within the path of a stream of glass flowing between these portions, usually from the melting chamber to the refining chamber under the influence of the pull on the tank.

In Fig. 2 of the accompanying drawing, I have shown a series of three of the temperature responsive devices, each generally indicated at 23, projecting upwardly through the top 15 of the weir 14, so as to be immersed in the stream of glass passing across the weir. It has been found in actual practice with a tank built in substantial accordance with the invention, that there will be a material stream of glass passing across the weir. By locating the couples as shown in the drawing, I am enabled to obtain the temperature of the glass substantially midway between the top of the weir and the normal level of the glass in the tank, which is a characteristic temperature for the glass.

By using a plurality of couples as indicated at spaced intervals transversely of the tank, I am enabled to get an average temperature of the stream of glass passing across the weir, that is, by suitably connecting the wires from the several couples either in parallel or in series, as may be desired, or as may be found most advantageous.

While I contemplate that the temperature responsive device or devices as shown herein may be utilized in an arrangement merely to indicate the temperature by which the rate of supply of heat to the tank may be manually controlled, I also contemplate that the temperature responsive devices 23 may be employed through suitable instruments including a control system to control such rate of heat supply automatically. For this reason, I have shown the lead wires from the several couples all passing to a temperature controlling instrument, here generally indicated at 24, which is supplied with current from line wires 25 and which is connected by a plurality of wires 26 with a reversible motor 27 and associated gearing and linkage for controlling the supply of fuel by operating a valve 28. While the valve 28 is diagrammatically shown in a fuel line 29 directed to but a single one of the burners 17, it will be understood that in practice such fuel valve will control as many or all the burners as may be desired. I have not illustrated in detail the internal construction of the control instrument 24 as instruments for this purpose are well known in the art and may be purchased in the open market, as also may the reversible motor 27 and its associated mechanism.

When using an automatic control system, it sometimes happens that due to certain conditions, the control system may be automatically adjusted to admit fuel to the furnace at such a high rate that portions of the tank, for example the crown, would be overheated with disastrous results. In order to avoid this, I provide a temperature responsive device 30, of the type shown in Fig. 3 or any conventional type, in the crown of the tank substantially at the point that would normally be expected to be the highest heated. This device is connected by lead wires 31 to the instrument 24, which is so arranged that when the temperature indicated by the device 30 reaches a predetermined high value, the safety limit, further increasing of the rate of fuel supply will be stopped and possibly also the fuel supply may be decreased according to the particular character of the instrument 24.

While I have shown and described but one embodiment of my invention, it will be understood that many changes in detail may be made therein and equivalents may be used where and as desired. I do not wish to be limited therefore except by the scope of the appended claims, which are to be construed as broadly as the state of the prior art permits.

I claim:

1. Apparatus for making glass, comprising a tank for containing a pool of glass arranged to be supplied with glass making materials adjacent to one end thereof and for the discharge of finished glass adjacent to the opposite end of the path of glass therethrough, means for supplying heat to the tank for melting the glass making materials and refining the melted glass, and means for obtaining an indication of the temperature of the glass according to which the heat supplied to the tank may be controlled, including a temperature responsive device projecting a material distance into the path of a freely flowing stream of melted glass in the tank, said temperature responsive device being so constructed and arranged as to afford a sensitive indication of changes in temperature in the glass throughout a material part at least of the useful life of the tank.

2. Apparatus for making glass, comprising a tank including a melting zone and a refining zone for containing a pool of glass and arranged to be supplied with glass making materials adjacent to one end of the melting zone and for the discharge of finished glass at the opposite end of the refining zone, means for supplying heat to the tank for melting the glass making materials in the melting zone and for refining the melted glass in the refining zone, and means for obtaining an indication of temperature of the glass in the tank according to which the heat supplied to the tank may be controlled, including a temperature responsive device projecting a material distance into the path of a freely flowing stream of melted glass passing through the constricted passage intermediate the melting and refining zones, said temperature responsive device being so constructed and arranged as to afford a sensitive indication of changes in temperature in the glass throughout a material part at least of the useful life of the tank.

3. Apparatus for making glass, comprising a tank including a melting zone and a refining zone, a weir extending transversely of the tank intermediate said zones and extending from the bottom of the tank up to a predetermined distance from the normal level of the bath of glass in the tank from side to side thereof, said melting zone being adapted to be supplied with glass making materials at one end thereof and said refining zone being arranged for the discharge of finished glass adjacent to the end thereof opposite said weir, means for supplying heat to the melting and refining zones of the tank for melting the glass making materials in the melting zone and refining the melted glass in the refining zone, and means for obtaining an indication of the temperature of the glass in the tank according to which the heat supplied to the tank may be controlled, including a temperature responsive device projecting through the weir from beneath and a material distance into the path of a freely flowing stream of melted glass passing across said weir intermediate the melting and refining zones.

4. Apparatus for making glass, comprising a tank for containing a pool of molten glass and divided into a melting zone and a refining zone by a constricted passage, the melting zone being arranged to be supplied with glass making materials adjacent to one end thereof and the refining zone being arranged for the discharge of finished glass therefrom, means for supplying heat to the tank in both of said zones for melting glass making materials in the melting zone and for refining the melted glass in the refining zone, temperature responsive means projecting a material distance into the path of a freely flowing stream of melted glass passing through the constricted passage intermediate the melting and refining zones and sensitively responsive to the temperature thereof, and means for automatically controlling said heat supplying means in response to the temperature to which said temperature responsive means is exposed.

5. Apparatus for making glass, comprising a tank for containing a pool of molten glass and arranged to be supplied with glass making materials adjacent to one end thereof and for the discharge of finished glass adjacent to the opposite end of the path of glass therethrough, means for supplying heat to the tank for melting the glass making materials and for refining the melted glass, temperature responsive means projecting a material distance into the path of a freely flowing stream of melted glass in the tank, automatic means for controlling the rate of supplying of heat by said heat supplying means in response to the temperature to which said temperature responsive means is exposed, and means associated with said automatic controlling means and responsive to the temperature in a selected part of the tank above the normal level of the glass therein for limiting the rate of supplying of heat when the temperature in such selected part of the tank reaches a predetermined high temperature.

6. Apparatus for making glass, comprising a tank for containing a pool of glass arranged to be supplied with glass making materials adjacent to one end thereof and for the discharge of finished glass adjacent to the opposite end of the path of glass therethrough, means for supplying heat to the tank for melting the glass making materials in the melting zone and for refining the melted glass in the refining zone, and temperature responsive means for indicating the temperature of the glass according to which heat supplied to the tank may be controlled, said temperature responsive means projecting a material distance into the path of a freely flowing stream of melted glass in the tank and including a thermocouple, the lead wires of which are passed through a rigid ceramic member projecting into the glass and a thimble of difficultly fusible metallic material neutral to glass surrounding and protecting said ceramic member from the chemical and erosive action of the glass, whereby the construction of the temperature responsive means as aforesaid permits it to be projected a material distance into the path of a freely flowing stream of glass at high temperature, the mechanical strength for sustaining the thermocouple in position being supplied by the ceramic material and the resistance to the chemical and erosive action of the glass being supplied by the metallic thimble thereabout.

7. Apparatus for making glass, comprising a tank for containing a bath of molten glass, means for supplying heat to the tank to melt glass making material supplied thereto and to refine the melted glass, and temperature responsive means associated with said tank and projecting through a glass contacting wall thereof a material distance into the molten glass to be sensitively responsive to temperature changes of the glass in the tank, said temperature responsive means including a thermocouple, lead wires thereto, a ceramic casing partially surrounding said thermocouple and the lead wires thereto, and a platinum containing metallic shield substantially neutral to glass surrounding said ceramic casing to protect it from the corrosive action of the molten glass and serving as the sole solid material through which heat must pass from the glass to the thermocouple.

8. The combination with a glass furnace of a temperature responsive device adapted to be projected a substantial distance into the molten glass and having a useful accurate life commensurate with the life of the furnace, said temperature responsive device comprising a thermocouple, an open ended ceramic shell surrounding said thermocouple for imparting the necessary strength to the temperature responsive device, and a platinum containing metallic shell neutral to glass at furnace temperatures and enclosing said ceramic shell and the thermocouple to protect them from the erosive and corrosive action of the molten glass.

HAROLD W. McINTOSH.